(12) United States Patent
Hagendoorn et al.

(10) Patent No.: US 7,942,730 B2
(45) Date of Patent: May 17, 2011

(54) DE-SKINNER FOR POULTRY PARTS

(75) Inventors: Jan Willem Hagendoorn, Oostzaan (NL); Eric De Jong, Oostzaan (NL); Eric Adriaan Van Hillo, Oostzaan (NL)

(73) Assignee: Meyn Food Processing Technology B.V., Oostzaan (NL)

(*) Notice: Subject to any disclaimer, the term of this patent is extended or adjusted under 35 U.S.C. 154(b) by 0 days.

(21) Appl. No.: 12/708,618

(22) Filed: Feb. 19, 2010

(65) Prior Publication Data

US 2010/0221991 A1 Sep. 2, 2010

(30) Foreign Application Priority Data

Feb. 27, 2009 (NL) ...................................... 2002580

(51) Int. Cl.
*A22C 17/12* (2006.01)
(52) U.S. Cl. ........................................................ 452/125
(58) Field of Classification Search .................. 452/125, 452/127–130, 133, 177–183, 198
See application file for complete search history.

(56) References Cited

U.S. PATENT DOCUMENTS

| | | | | | |
|---|---|---|---|---|---|
| 4,691,412 | A | * | 9/1987 | Brown | 452/14 |
| 4,715,092 | A | * | 12/1987 | Lerner et al. | 452/151 |
| 4,748,721 | A | * | 6/1988 | Braeger | 452/127 |
| 5,192,241 | A | * | 3/1993 | Saita | 452/135 |
| 5,197,917 | A | | 3/1993 | Verbakel et al. | |
| 5,299,975 | A | * | 4/1994 | Meyn | 452/177 |
| 5,597,351 | A | * | 1/1997 | Queally et al. | 452/135 |
| 5,823,864 | A | * | 10/1998 | Watanabe | 452/182 |
| 5,836,266 | A | * | 11/1998 | Watanabe | 119/234 |
| 6,086,468 | A | * | 7/2000 | Yoshida et al. | 452/14 |
| 6,220,953 | B1 | | 4/2001 | Cornelissen et al. | |
| 6,383,068 | B1 | * | 5/2002 | Tollett et al. | 452/170 |
| 6,736,716 | B1 | * | 5/2004 | Sugiyama | 452/2 |
| 7,070,493 | B2 | * | 7/2006 | Hazenbroek et al. | 452/83 |
| 7,258,604 | B2 | * | 8/2007 | Reutter | 452/30 |
| 7,314,405 | B2 | * | 1/2008 | Florindo et al. | 452/31 |
| 7,662,031 | B1 | * | 2/2010 | Gasbarro | 452/130 |
| 7,794,311 | B2 | * | 9/2010 | Groenewegen et al. | 452/173 |
| 2003/0181157 | A1 | | 9/2003 | Annema et al. | |

OTHER PUBLICATIONS

Search report for NL 2002580, Oct. 5, 2009.

* cited by examiner

*Primary Examiner* — Thomas Price
(74) *Attorney, Agent, or Firm* — Dority & Manning, P.A.

(57) ABSTRACT

The present invention relates to a de-skinner for poultry-parts. In one exemplary embodiment, the deskinner includes an infeed for the poultry parts, a processing device for removing the skin from the poultry parts, and a discharge for the processed poultry parts. Receptacles are provided for receiving the poultry parts from the infeed. The receptacles are connected to a conveyor-line for transporting the receptacles with the poultry parts to the processing device for removing the skin from the poultry parts. The receptacles are equipped with pressing means for pressing the poultry parts into intimate contact with the processing device.

12 Claims, 8 Drawing Sheets

DE-SKINNER FOR POULTRY PARTS

FIELD OF THE INVENTION

The invention relates to a de-skinner for poultry parts, such as thighs or drums, and can include an infeed for the parts, a processing device for removing the skin from the parts, and a discharge for the processed parts. For the actual removal of the skin from the poultry parts usually, though not exclusively, a processing device is applied that can include rollers.

BACKGROUND OF THE INVENTION

It is an object of the invention to improve the deskinning by the processing device of the de-skinner.

It is a further object of the invention to increase the reliability of the deskinning operation since in practice it turns out that according to the prior art the deskinning operations vary in their effectivity depending on the orientation of the poultry parts, in particular the thighs or drums.

It is still a further object of the invention to set up a de-skinner which can process poultry parts in an entirely automated fashion without human intervention.

The de-skinner of the invention is to these ends embodied in accordance with one or more of the appended claims.

SUMMARY OF THE INVENTION

Objects and advantages of the invention will be set forth in part in the following description, or may be obvious from the description, or may be learned through practice of the invention.

In one exemplary embodiment, the de-skinner of the present invention includes receptacles for receiving the poultry parts from the infeed. The receptacles are connected to a conveyor-line for transporting the receptacles with the poultry parts to the processing device for removing the skin from the parts. In a first aspect of the invention at least one of the receptacles is rotatably connected to the conveyor-line so as to be able to adjust the orientation of the poultry part that is received in the at least one receptacle. This promotes the quality of the de-skinning operation.

It is desirable that the receptacles are equipped with pressing means for pressing the poultry parts into intimate contact with the processing device. This effectively further promotes the quality of the deskinning operation by the processing device.

It is also desirable that the receptacles are placed in series and are arranged to cooperate with the infeed such that each receptacle receives one poultry part only. This allows that a very accurate placement of the individual parts can be realized which is desirable in view of the quality of the de-skinning operation.

Advantageously the conveyor-line is equipped with a series of receptacles, wherein the series includes a sequence of receptacle-sets, each set comprising a first receptacle and a second receptacle. The first receptacle can, for example then receive a thigh or a drum originating from a right leg, whereas the second receptacle can, for example, then receive a thigh or a drum that originates from a left leg of the poultry.

In such a situation in which the poultry thighs or drums are following each other in the series of receptacles in pairs of right leg parts and left leg parts, it is beneficial that at least one of the receptacles in each receptacle-set is rotatably connected to the conveyor-line. With this measure it is simply possible to move both thighs or drums originating from a left leg and a right leg respectively into the same orientation, thus promoting the effectivity and reliability of the de-skinning operation by the processing device.

A preferred exemplary embodiment which facilitates the operation on the poultry parts by the processing device includes a conveyor-line that is arranged to move the receptacles upside-down past the processing device for removing the skin from the parts, so as to cause that the poultry parts contact the processing device at least in part due to gravity.

It is further preferred that the receptacles are embodied with side-walls and a bottom-wall that is movable with respect to the side-walls, so as to enable that the bottom-wall presses a poultry part when the concerning receptacle is in upside-down position.

An even further preferred exemplary embodiment is then to have the bottom-wall being spring loaded.

Consistent with the objective of the invention to promote the accuracy of handling and processing, it is preferred that the infeed for the poultry parts includes a gripper or grippers, wherein each gripper is arranged to hold one part and drop it in a receptacle.

Desirably the gripper or grippers are arranged with cooperating fingers to hold the poultry parts, which fingers are vertically swivable so as to facilitate accurate placement of the poultry parts in the receptacles.

In still an other exemplary embodiment of the invention, a device is provided that includes a handler for the receptacles that is placed between the infeed and the processing device and is equipped to rotate at least one of the receptacles and/or at least one out of each set of two receptacles that the conveyor-line moves past the handler. This allows that the poultry parts in the subsequent receptacles can all be given the same orientation, which thus promotes the effectiveness of the deskinning operation concerning those poultry parts. This applies in particular when the parts are poultry legs or parts thereof.

Still a further exemplary aspect of the invention is that the discharge for the processed poultry parts includes a discharge-line with carriers for receiving therein de-skinned poultry parts. The discharge-line is driven synchronously with the conveyor-line and is placed in the vicinity of the conveyor-line behind the processing-device, so as to secure a timed cooperation of the receptacles of the conveyor-line with the carriers of the discharge-line for the transfer of the poultry parts from the conveyor-line-receptacles to the discharge-line-carriers. This makes an effective automated further processing of the deskinned parts very easy. Such further processing may for instance relate to a deboning operation in order to harvest the meat.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures. The invention shall hereinafter be further elucidated with reference to figures depicting a preferred exemplary embodiment of the de-skinner of the invention, as used for the deskinning of poultry thighs. It is, however, expressly stated that the method and apparatus of the invention can also be used for deskinning of drums, or for deskinning of other poultry parts.

Wherever in the figures the same reference numerals are applied, these numerals refer to the same parts.

DETAILED DESCRIPTION

Figure 1:
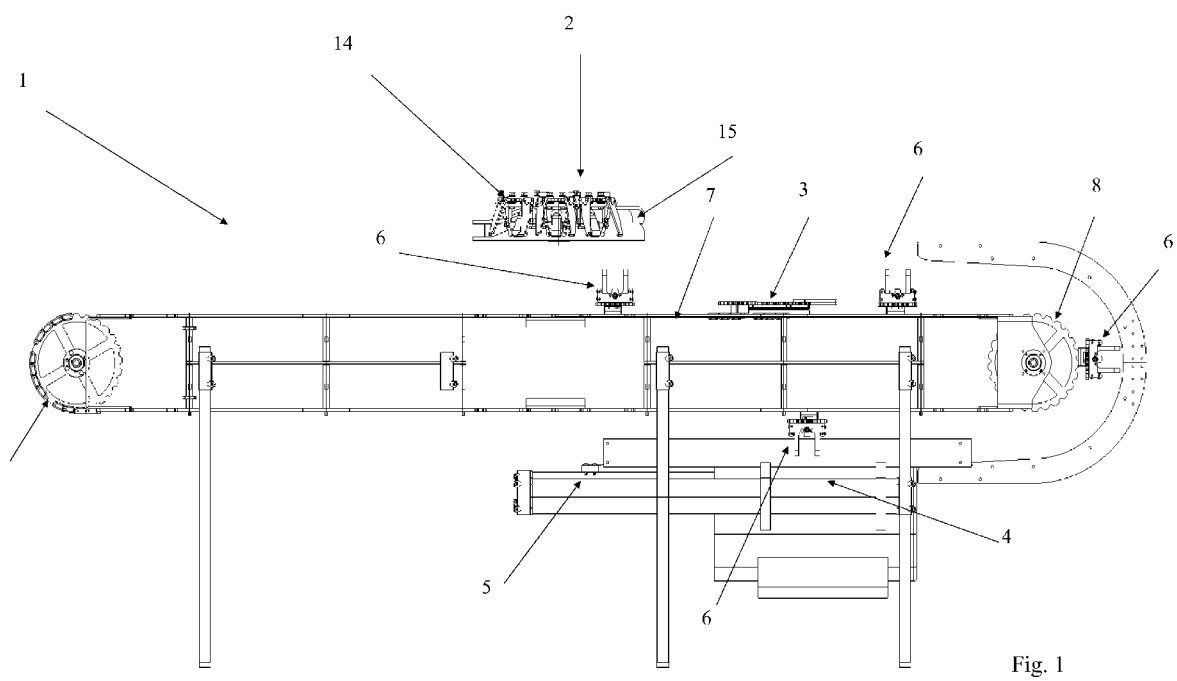
FIG. 1 shows the de-skinner of the invention in a side view.
Figure 1A:
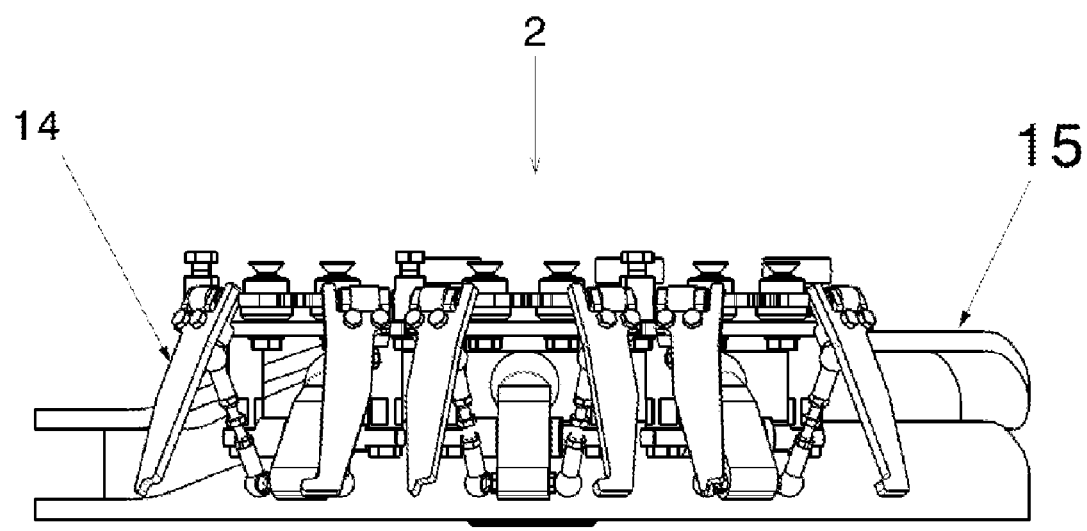

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

With reference first to FIG. 1 an exemplary de-skinner 1 of the invention for poultry thighs is shown, including an infeed 2 for the thighs, a processing device 4 for removing the skin from the thighs, and a discharge 5 for the processed thighs.

The de-skinner 1 is provided with receptacles 6 for receiving the thighs from the infeed 2. The receptacles 6 are connected to a conveyor-line 7 for transporting the receptacles 6 with the thighs placed therein to the processing device 4 where the skin is removed from the thighs. The receptacles 6 are equipped in a manner to be shown hereinafter with pressing means for pressing the thighs into intimate contact with the processing device 4.

As will be clear to the artisan, the conveyor-line 7 is provided with a series of receptacles 6 such that each of the consecutive receptacles 6 will cooperate with the infeed 2 in a manner that each receptacle 6 will receive one thigh only.

After having received a thigh, the receiving receptacle 6 is, like the previous receptacles therefore and the following receptacles thereafter, moved through a handler 3 that is placed between the infeed 2 and the processing device 4. The handler 3 is equipped to rotate or not rotate the receptacles 6 that the conveyor-line 7 moves past this handler 3, depending on the circumstances. In connection therewith at least one of the receptacles 6 is rotatably connected to the conveyor-line 7 so as to be able to adjust the orientation of the thigh in the concerning receptacle 6.

More particularly it is preferred that the conveyor-line 7 is equipped with a series of receptacles 6 wherein this series includes a sequence of receptacle-sets, wherein each set includes a first receptacle and a second receptacle intended to receive a thigh from a poultry's left leg and a thigh from a poultry's right leg respectively. The requirement is then that at least one of the receptacles 6 in each receptacle-set is rotatably connected to the conveyor-line 7 so as to enable that the thighs originating from the left leg and the right leg of the poultry can be placed, by the operation of the handler 3, in the same orientation and subsequently be processed effectively by the processing device 4 in order to remove the skin from these thighs.

Figure 5:
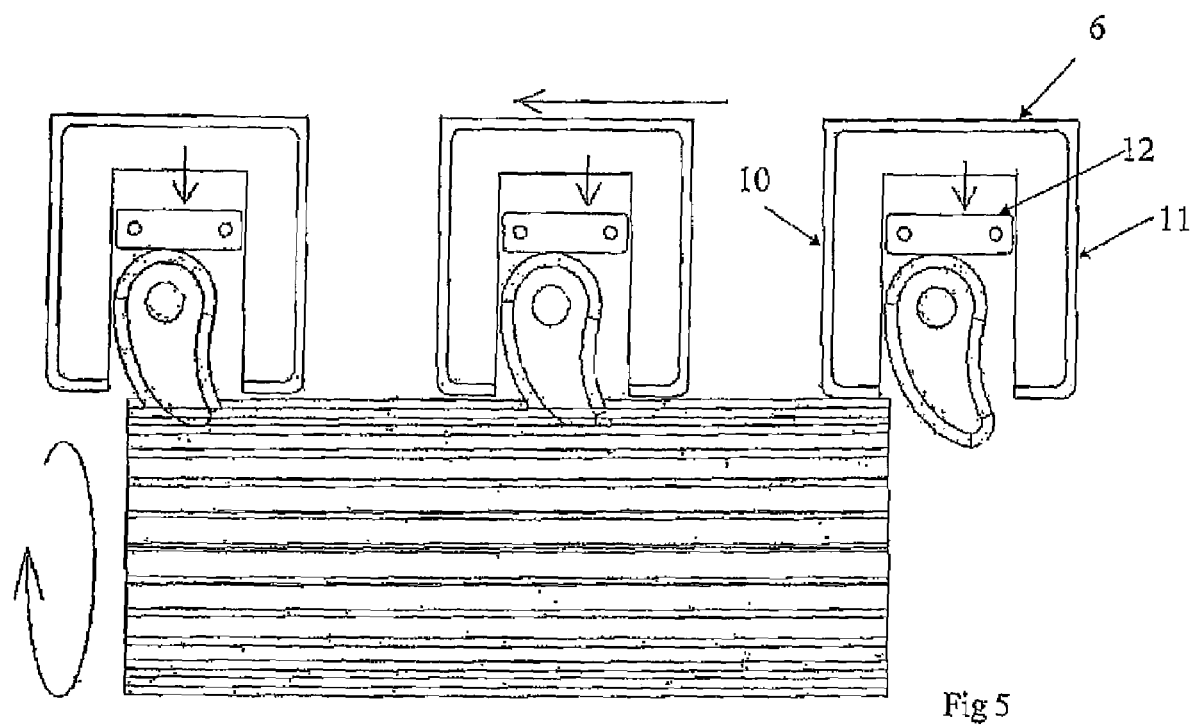
FIG. 5 shows some receptacles of the de-skinner upside-down.

FIG. 1 shows that the conveyor-line 7 and the receptacles 6 connected thereto move in a continuous endless-line due to the fact that the conveyor-line 7 is guided along guide wheels 8 and 9. By passing guide wheel 8 the receptacles 6 that are connected to the conveyor-line 7 are moved from their regular orientation with an open top to an upside-down position in which they pass the processing device 4 for removing the skin from the thighs. As a result, the thighs contact the processing device 4 at least in part due to the operation of gravity. According to a preferable aspect of the invention, the receptacles 6 are, however, embodied with side walls 10 and 11 and a movable bottom-wall 12, as clearly shown in FIG. 5 which concerns some receptacles shown in the upside-down position. The bottom-wall 12 that is movable with respect to the side walls 10, 11, enables that the bottom 12 may press a thigh due to the weight of the bottom-wall 12 into intimate contact with the processing device 4, once this receptacle 6 passes the processing device 4.

In order to assist the pressing function of the bottom-wall 12 it is further possible that the bottom-wall 12 is spring loaded. Although this is not shown in the figures it is perfectly clear to the artisan how to implement same.

Figure 2:
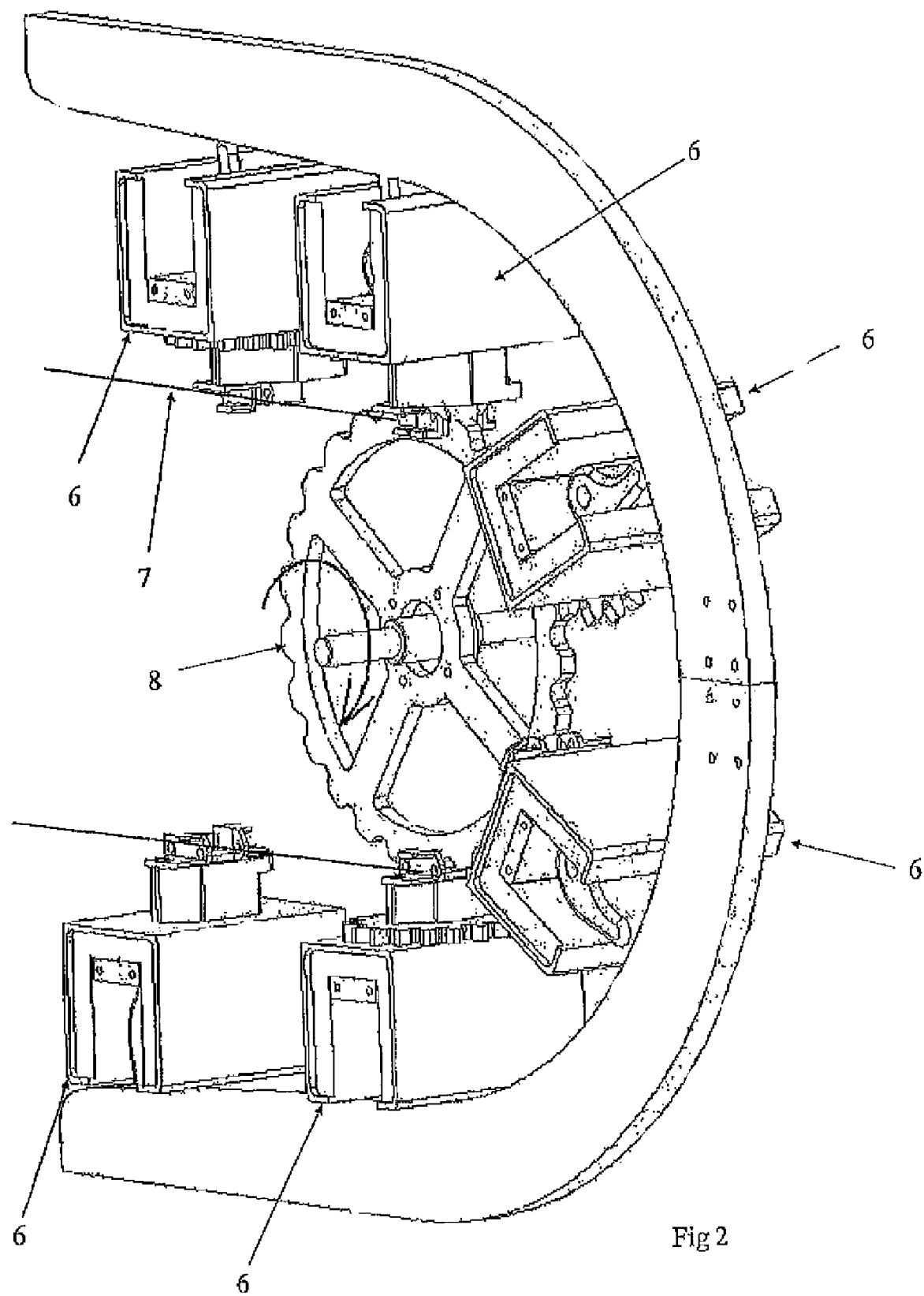
FIG. 2 shows a detail of the apparatus shown in FIG. 1.

The actual moving of the receptacle 6 from the regular open top position to the upside-down position of the receptacle 6 by movement along the guide wheel 8 is shown in more detail in FIG. 2. Once the receptacles 6 are placed in the complete upside-down position they are ready to enter the processing device 4 for removing the skin from the thighs that are contained in the receptacles 6.

With reference to FIG. 1 it is shown that the infeed 2 for the thighs includes a gripper 14 or a series of grippers that are moved past the infeed 2 wherein each gripper 14 connects to a moving device, for instance a chain 15. Each gripper 14 is then arranged to hold one thigh only and drop it in a receptacle 6. The gripper 14 is shown in more detail in FIGS. 3A and 3B.

Figure 3A:
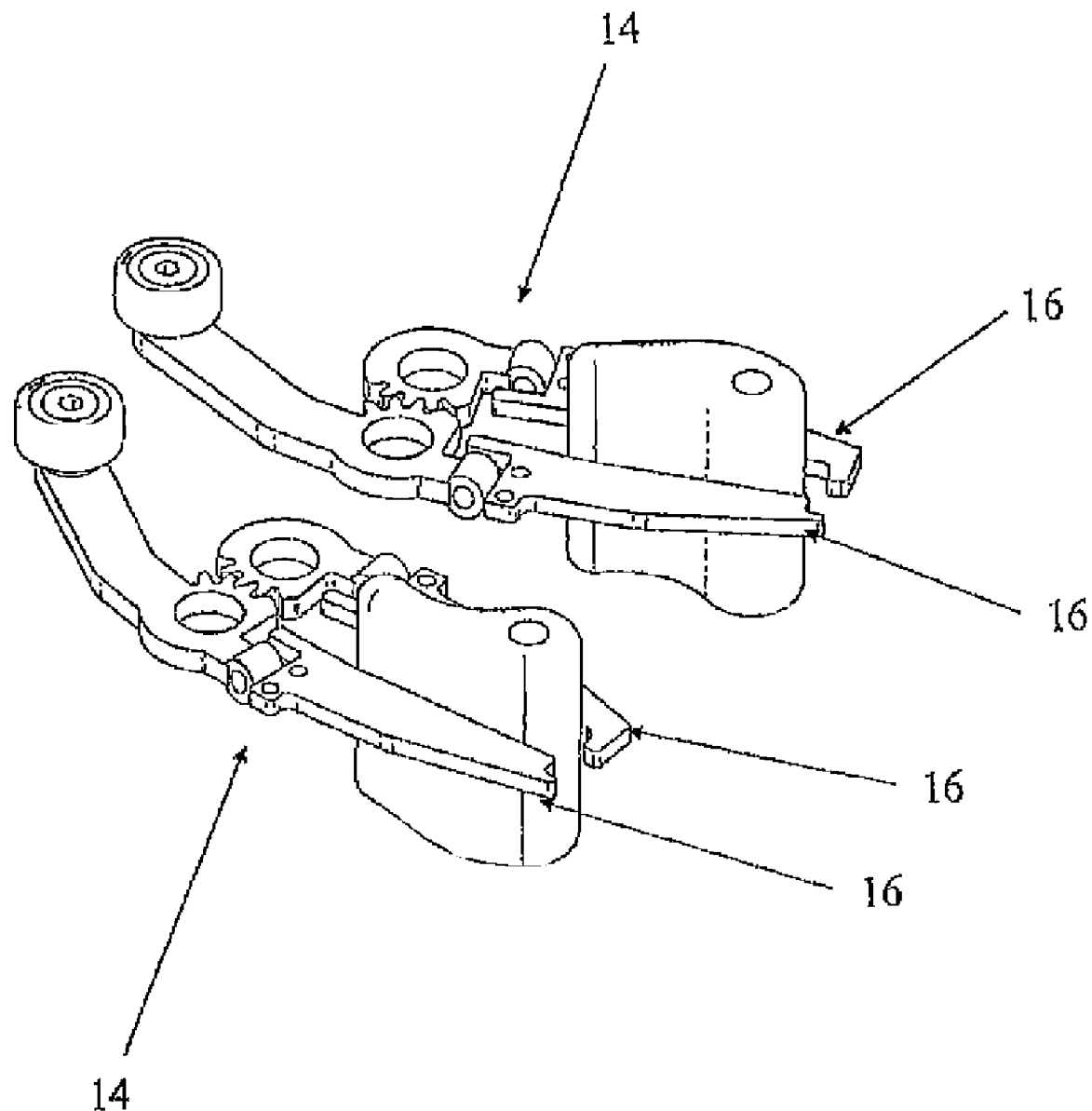
FIG. 3a and FIG. 3b show a gripper for thighs as used in the infeed of the de-skinner.
Figure 3B:
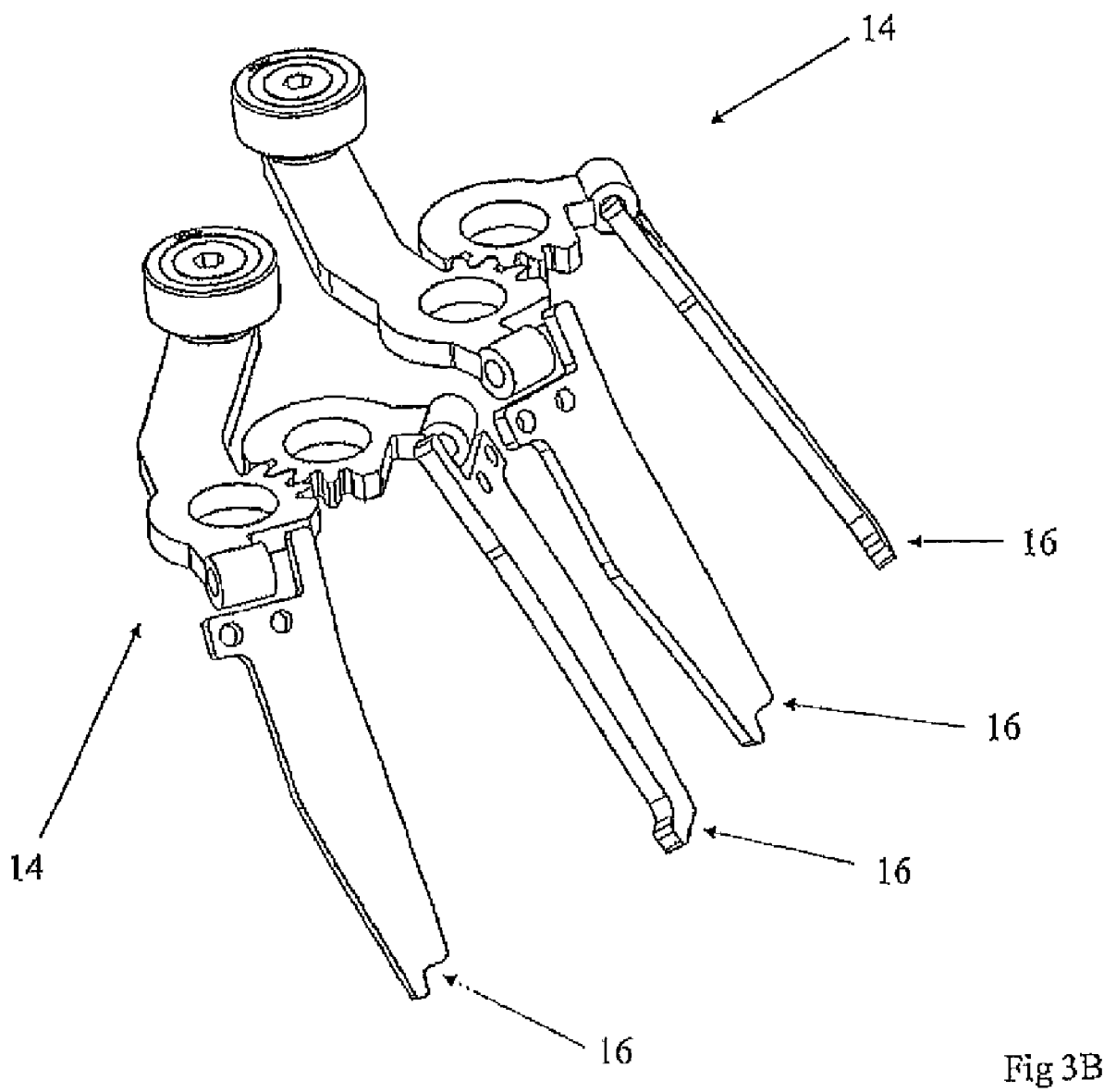

FIG. 3A shows the gripper 14 with cooperating fingers 16 that are closed to hold a thigh. As shown in FIG. 3B, the fingers 16 are shown in an open condition so as to release the earlier held thigh. FIG. 3B also shows that the fingers 16 are vertically swivable which is effective for accurately positioning the thighs upon their release to drop them in the receptacles 6.

Figure 4:
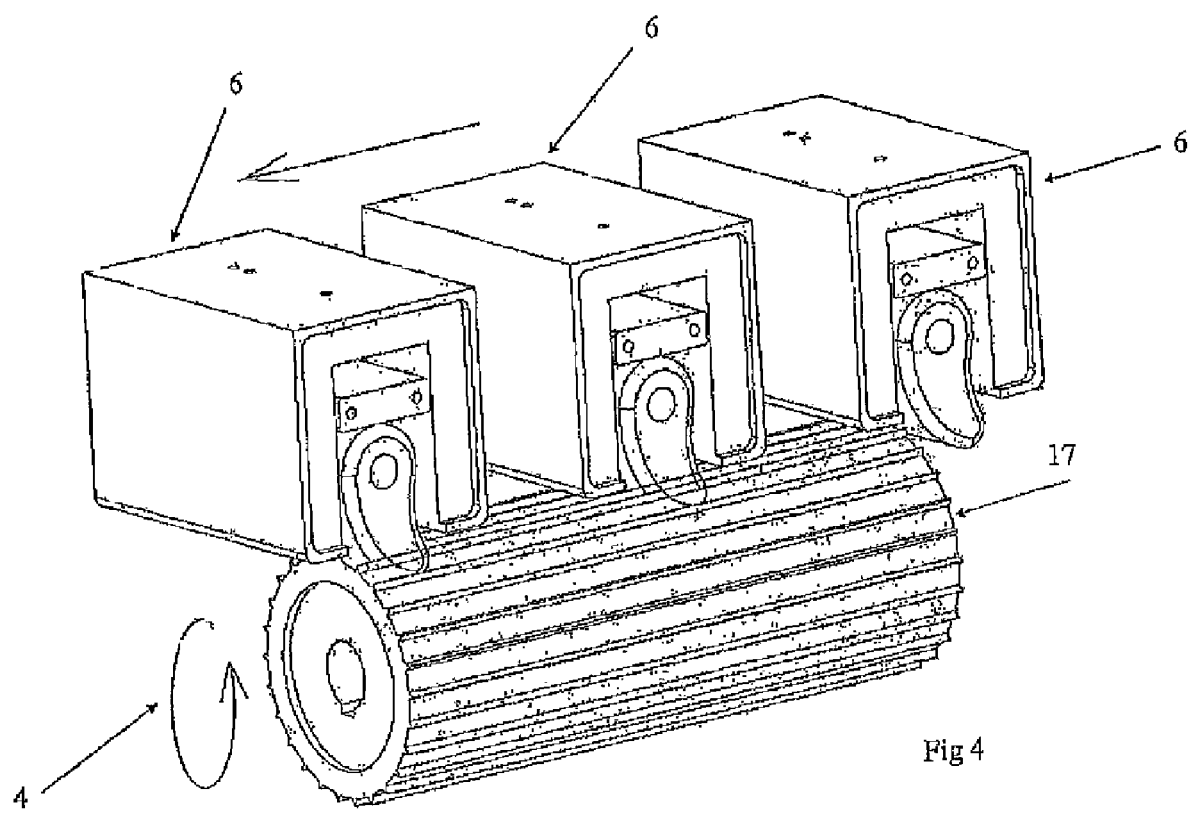
FIG. 4 shows a schematic view of the processing device for removing the skin from the thighs.

FIG. 4 shows a detail of the de-skinner of the invention in which a series of receptacles 6 are in upside-down condition directly on top of the processing device 4 including inter alia a grooved roller 17 known per se to effect the deskinning of the thigh moved by the receptacles 6 over the processing device 4.

Figure 6:
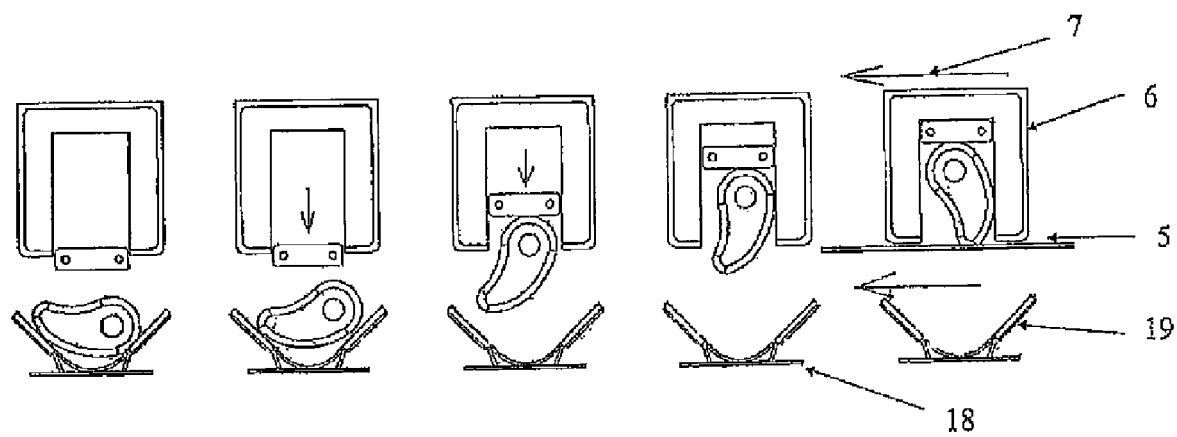
FIG. 6 shows a detail of the discharge for the processed thighs.

With reference to FIG. 6 a detail view of the discharge 5 for the processed thighs is shown that follows the processing device 4. (see also FIG. 1).

The discharge 5 includes a discharge line 18 that is provided with carriers 19 as shown in FIG. 6. Each carrier 19 is equipped for receiving therein the thighs that are deskinned in the processing device 4. To this end the discharge line 18 is driven synchronously with the conveyor-line 7 and is placed in the vicinity of the conveyor-line 7 following the processing device 4. By means of synchronization of the discharge line 18 and the conveyor-line 7, it is secured that a timed cooperation of the receptacles 6 of the conveyor-line 7 with the carriers 19 of the discharge line 18 can be implemented for the transfer of the thighs from the conveyor-line 7—receptacles 6 to the discharge line 18—carriers 19. Once the deskinned thighs are in the carriers 19 of the discharge line 18, the deskinned thighs may be conveyed to a further processing device, for instance for deboning the thighs and harvesting the meat from the thighs.

It is expressly remarked that the claims and the invention to which it relates are not to be considered restricted to the specific exemplary embodiment as shown in the figures as discussed herein-above. This exemplary embodiment and its description merely serves to elucidate the terms of the claims without intend to restrict the scope of these claims to anything else than is consistent with their wording. The scope of protection that the invention merits should therefore only be decided in relation to the wording of the claims whereas any possible ambiguity in respect of these claims should be resolved with reference to the given example. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. An apparatus for de-skinning poultry parts, comprising:
an infeed for supplying poultry parts;
a processing device for removing the skin from the poultry parts;
a conveyor line comprising a plurality of receptacles configured for receipt of poultry parts from said infeed and configured for transporting the poultry parts to said processing device, each said receptacle comprising a pair of sidewalls, wherein at least one of said receptacles is rotatably connected to said conveyor line so that the relative position of said pair of sidewalls along the direction of movement of the conveyor line can be reversed to allow the orientation of the poultry part received in said at least one receptacle to be adjustable between left and right sides of the poultry; and
a discharge for the processed poultry parts.

2. An apparatus for de-skinning poultry parts as in claim 1, wherein said receptacles are placed in a series and are arranged to cooperate with said infeed such that each said receptacle receives only one poultry part from the plurality of poultry parts provided by said infeed.

3. An apparatus for de-skinning poultry parts, comprising:
an infeed for supplying poultry parts;
a processing device for removing the skin from the poultry parts;
a conveyor line comprising a plurality of receptacles configured for receipt of poultry parts from said infeed and configured for transporting the poultry parts to said processing device, wherein at least one of said receptacles is rotatably connected to said conveyor line so that the orientation of the poultry part received in said at least one receptacle is adjustable; and
a discharge for the processed poultry parts;
wherein said plurality of receptacles comprises a sequence of receptacle sets with each set comprising a first receptacle and a second receptacle.

4. An apparatus for de-skinning poultry parts as in claim 3, wherein said conveyor line is configured to invert said receptacles as such are moved past said processing device so that the poultry parts contact the processing device due at least in part to gravity.

5. An apparatus for de-skinning poultry parts, comprising:
an infeed for supplying poultry parts;
a processing device for removing the skin from the poultry parts;
a conveyor line comprising a plurality of receptacles configured for receipt of poultry parts from said infeed and configured for transporting the poultry parts to said processing device, wherein at least one of said receptacles is rotatably connected to said conveyor line so that the orientation of the poultry part received in said at least one receptacle is adjustable; and
a discharge for the processed poultry parts;
wherein each said receptacle comprises a pair of side walls and a bottom wall that is movable between the side walls such that the bottom wall is configured to press a poultry part when said receptacle is inverted.

6. An apparatus for de-skinning poultry parts as in claim 5, wherein the bottom of wall of said receptacle is spring-loaded.

7. An apparatus for de-skinning poultry parts as in claim 5, wherein said infeed for poultry parts comprises a plurality of grippers with each said gripper configured for holding one poultry part and dropping the poultry part into one of said receptacles of said conveyor line.

8. An apparatus for de-skinning poultry parts as in claim 7, wherein each said gripper comprises cooperating fingers to hold the poultry parts, said fingers being vertically swivable so as to facilitate the accurate placement of poultry parts in said receptacles.

9. An apparatus for de-skinning poultry parts as in claim 5, further comprising a handler for said receptacles, said handler positioned between said infeed and said processing device, said handler equipped to rotate certain selected receptacles as said conveyor line moves said receptacles past said handler.

10. An apparatus for de-skinning poultry parts as in claim 5, wherein said discharge further comprises a discharge line having a plurality of carriers, said discharge line driven in synchronization with said conveyor line and placed proximate to said conveyor line after said processing device so as to secure a timed cooperation between said receptacles and said carriers.

11. An apparatus for de-skinning poultry parts as in claim 5, where said receptacles comprises pressing means for pressing the poultry parts into contact with said processing device.

12. An apparatus for de-skinning poultry parts, comprising:
an infeed for supplying poultry parts comprising a left leg and thigh and a right leg and thigh;
a processing device for removing skin from the poultry parts;
a conveyor line comprising a plurality of receptacles configured for receiving poultry parts from said infeed and transporting the poultry parts to said processing device, at least one said receptacle comprising a pair of sidewalls, said at least one receptacle attached to said conveyor line such that the relative position said pair of sidewalls with respect to said conveyor line can be switched such that thighs from the left leg and the right leg of the poultry can be placed in the same orientation; and
a discharge for the processed poultry parts.

* * * * *